United States Patent [19]

Visser

[11] 4,273,343
[45] Jun. 16, 1981

[54] SHAFT SEAL
[75] Inventor: Teunis Visser, Sliedrecht, Netherlands
[73] Assignee: IHC Holland N.V., Rotterdam, Netherlands
[21] Appl. No.: 92,556
[22] Filed: Nov. 8, 1979
[30] Foreign Application Priority Data
  Nov. 10, 1978 [NL] Netherlands .......................... 7811164
[51] Int. Cl.³ .......................... F16J 15/40; F16J 15/44
[52] U.S. Cl. .......................................... 277/53; 277/3; 277/135; 277/203
[58] Field of Search ...................... 277/53, 203, 204, 3, 277/27, 135, 13

[56] References Cited
U.S. PATENT DOCUMENTS

| 2,487,177 | 11/1949 | Pollock . | |
|---|---|---|---|
| 3,797,962 | 3/1974 | Stahlecker | 277/53 X |
| 3,801,235 | 4/1974 | Douglas | 277/53 X |
| 3,823,950 | 7/1974 | Pedersen | 277/53 X |
| 4,010,960 | 3/1977 | Martin | 277/203 X |
| 4,076,259 | 2/1978 | Raimondi | 277/27 X |

FOREIGN PATENT DOCUMENTS

| 2363661 | 7/1974 | Fed. Rep. of Germany | 277/203 |
|---|---|---|---|
| 2349077 | 11/1977 | France . | |
| 657965 | 10/1951 | United Kingdom . | |

Primary Examiner—Robert S. Ward, Jr.
Attorney, Agent, or Firm—Young & Thompson

[57] ABSTRACT

The present invention relates to a seal of a shaft being rotatable relative to a stationary housing, said shaft being provided with a groove (3, 13), said groove being spiraled such that during rotation of the shaft the groove will pump fluid from the high-pressure side towards the low-pressure side. The shaft portion provided with the helical groove coacts with an abutting flexible sleeve (6) so that the amount of fluid which is allowed to escape in a controlled manner can be determined.

7 Claims, 4 Drawing Figures

SHAFT SEAL

The present invention relates to a seal of a shaft, said shaft being rotatable relative to a stationary housing and being provided with a helical groove, said groove cooperating with a cylindrical surface, said surface surrounding said part of the shaft.

A seal of this kind has generally been known. In the case of the known seal, the helical groove is located such that during rotation of the shaft said groove will feed back the medium which tends to escape from the spaces to be sealed. Thus, in the known sealing device the groove acts as a pump; its function is emphasized by the fact that in the region of the helical groove a bush surrounds the shaft with a slight clearance, so that the sealing is established by the viscosity of the fluid film between the shaft and the bush and the groove will exert a backward force on said film.

A seal of this kind is not effective under all circumstances, particularly when the medium contains solid particles, such as sand and the like. The helical groove has only a modest feed-back-effect. In most cases, its thrust is not enough to act against the pressure prevailing in the region, so that inspite of the thrust brought about by the groove, medium will still enter and leak out. The latter is being prevented by the provision of a fully effective seal on the outer side. However, it is then not possible to prevent the groove from being gradually filled with particles which, during operation, will cause wear, as a consequence of which the seal and, if needed, also a plain bearing disposed in that region will have to be replaced.

It is an object of the invention to provide a solution for the problem of sealing, with which a longer life time is attained in a simple manner. In accordance with the invention, said object is achieved, in that the groove thread with respect to the direction of rotation of the shaft is such that the groove carries medium from the housing beyond the confines of the seal, i.e. from the high-pressure space to the low-pressure region and the cylindrical surface is constituted by a flexible sleeve, the outer surface of said sleeve being under the influence i.e. pressure of the space to be sealed. A small amount is deliberately discharged from the groove and, thus, a pressure drop is obtained which can accurately be determined. The matter which is discharged by the groove beyond the confines of the seal can be drained off there or carried back by connecting the relevant region to a pump which delivers to the pressure chamber. The principle of the invention is to create deliberately an accurately determined leak so that no deposits, which may cause wear, will be formed. The flexible sleeve takes care that there is no clearance between the contact surface and the outer surface of the groove, so that the width section of the groove remains always the same. If wear develops on the sleeve, it will still remain in abutting relationship so that operation will remain the same.

In accordance with the invention, a plurality of series-connected seal sleeves with intermediate pressure chambers can be used, said sleeves acting on one and the same groove.

High pressure can then be decreased in stages with the same modest leak.

It can also be useful to seal the last chamber at its outer periphery with a sleeve acting on a smooth contact surface, in which the groove terminates in the last chamber. Said last chamber is preferably the one which is connected to a drainage system or feed-back device.

The sleeve has preferably an L-shaped cross-section, its horizontal leg being directed towards the high-pressure side and being in contact with the shaft. The pressure will assist the sleeve in abutting the shaft.

When seen in longitudinal section of the shaft the groove is preferably profiled with a steep flank at the low-pressure side and a faintly inclined flank at the high-pressure side.

It is thus achieved, that the faintly inclined flank of the groove constitutes a wedge-shaped space with the sleeve, in which space the so-called Mitchell-effect occurs, i.e. a lubricating effect. The lubrication is brought about by the formation of a film between the sleeve and the shaft. The flank is preferably constituted in such a way that the faintly inclined flank gradually goes over into the circumference of the shaft. The formation of a film will, thus, be improved. In this way, an exceptionally low friction between the shaft and the sleeve is achieved, while maintaining the principle of accurate dosage of the escaping fluid.

Whereas the known seal and groove with its inward-force can resist only a small difference in pressure, the present invention makes it possible to allow considerable differences with the aid of a controlled leak system. When several series-connected seals are used, the pressure can be decreased in stages. The seal according to the invention is particularly suitable for use when dirty fluids, such as sand-containing liquids, and large differences in pressure, such as in the case of a dredge pump, are involved.

The invention will now be described more in detail with reference to the drawings, in which.

Figure 1:
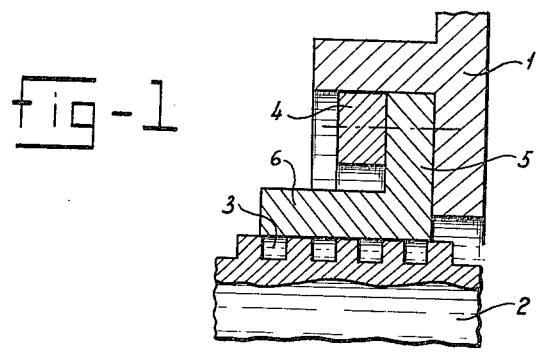
FIG. 1 is a sectional view of a seal according to the invention, in its most simple embodiment.

FIG. 1 illustrates a housing 1 having a shaft 2, said shaft being rotated e.g. to the right and being provided with a helical groove 3 being also spiraled to the right and which, according to the drawing, carries the fluid from the left to the right. A sleeve 5, L-shaped in cross-section, is secured to the housing with the aid of clamping ring 4; the horizontal leg 6 of said sleeve 5 butts against the grooved portion of shaft 2.

Figure 2:
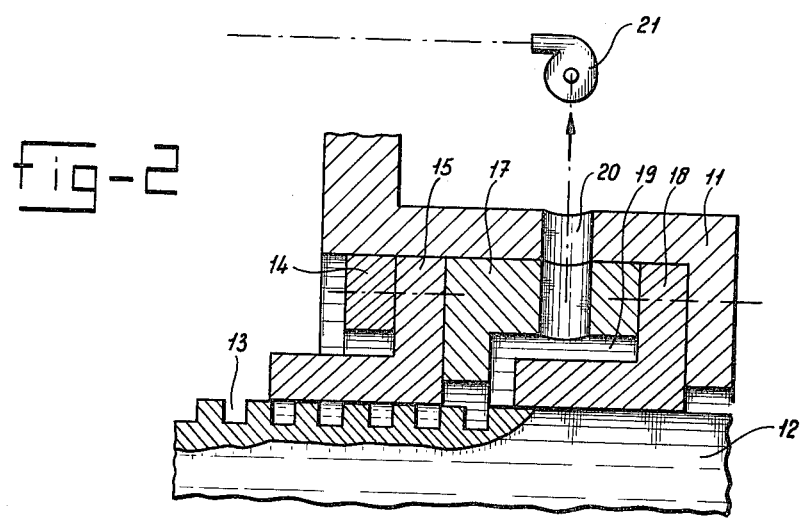
FIG. 2 illustrates the same seal as shown in FIG. 1, but having in addition a sealing further outwardly, and with feed-back of the fluid escaped via the seal.

In the embodiment in FIG. 2, a shaft 12 is mounted in the housing 11, said shaft 12 being provided with a helical groove 13. Two L-shaped sealing sleeves 15 and 18 have been secured in said housing with the aid of clamping ring 14 and intermediate ring 17. At the region of the supporting ring 17 a chamber 19 is located between said sleeves 15 and 18; groove 13 terminates in said chamber and will drain the medium penetrating into that region via a bore 20, e.g. towards pump 21, which carries back the fluid into the housing 11.

The horizontal leg of the seal sleeve 18 is in an abutting relationship with a smooth portion of the shaft and ensures a proper sealing in that region since there is hardly any pressure left in chamber 19.

Figure 3:
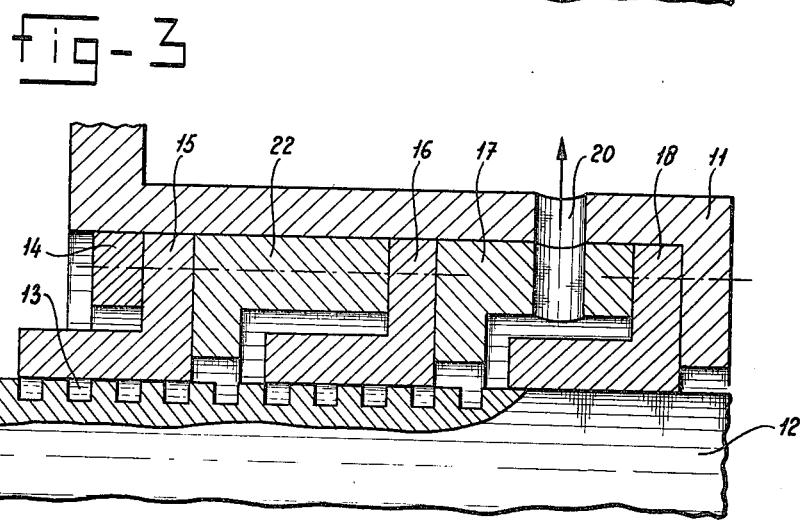
FIG. 3 illustrates a plurality of series-connected seals.

FIG. 3 shows an embodiment which is essentially similar to the one illustrated in FIG. 2, but in which three sealing sleeves 15, 16 and 18 with clamping ring 14 and intermediate rings 17 and 22 are used instead of two sleeves.

When this seal is used in a pump, the bore 20 can be connected direct to the suction side of said pump via a passage.

Figure 4:
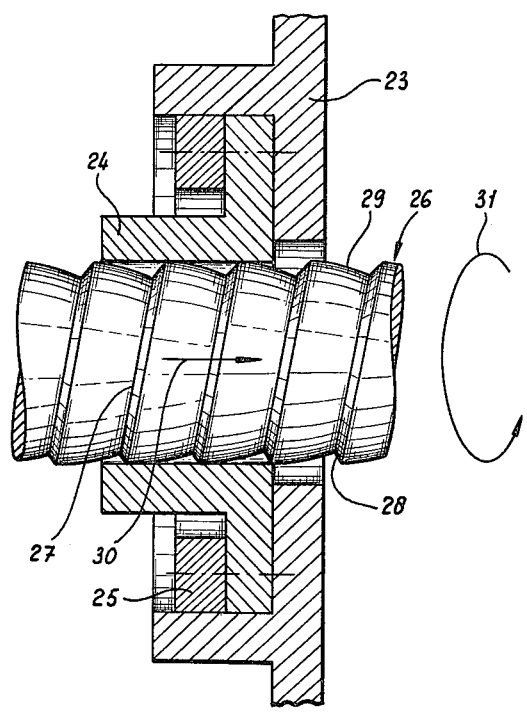
FIG. 4 illustrates an embodiment with a special groove profile.

In the embodiment illustrated in FIG. 4, sleeve 24 is secured in the housing 23 by means of a clamping ring 25 in the same way as shown in the other Figures. Shaft 26 is provided with a groove 27, said groove having a steep flank 28 and a faintly inclined flank 29. With the inner side of sleeve 24 said flank 29 constitutes a wedge-shaped space.

Seen in the direction of arrow 30, the shaft 26 is rotated to the right (see arrow 31) and the fluid is forced into the wedge-shaped space, as a result of which a film is formed between the flank 29 and the inner side of the sleeve.

In this way, an exceptionally simple sealing is accomplished, in which a certain amount of leakage is deliberately created; the leak fluid is fed back and, thus, wear is avoided.

I claim:

1. Seal of a shaft, said shaft being rotatable relative to a stationary housing and being provided with a helical groove, said groove cooperating with a cylindrical surface, said surface surrounding said shaft, characterized in that the groove thread with respect to the direction of rotation of the shaft is always such that the groove carries medium from the housing beyond the confines of the seal, from the high-pressure region to the low-pressure space, and the cylindrical surface surrounding the shaft is constituted by a flexible sleeve, the outer surface of said sleeve being under the pressure of the space to be sealed.

2. Seal according to claim 1, characterized by a plurality of series-connected seal sleeves acting on the same helical groove and pressure chambers located between said seal sleeves.

3. Seal according to claim 2, characterized in that the sealing sleeve defining the last pressure chamber to the outer side is in an abutting relationship with a smooth cylindrical portion of the shaft, with the groove terminating in said last chamber.

4. Seal according to claim 3, characterized in that a collecting chamber is located at the region of the outer side of the seal, forming a low-pressure chamber, said collecting chamber being connected to the suction side of a pump, the delivery side of said pump connecting to the space to be sealed.

5. Seal according to claim 1, characterized in that the sleeve has an L-shaped cross-section, its horizontal leg being directed towards the high-pressure side and being in contact with the shaft.

6. Seal according to claim 1, characterized in that seen in longitudinal section of the shaft, the groove is profiled with a steep flank at the low-pressure side and with a less steeply inclined flank at the high-pressure side.

7. Seal according to claim 6, characterized in that the less steeply inclined flank gradually fairs over into the circumference of the shaft.

* * * * *